United States Patent [19]
dos Santos

[11] 4,221,340
[45] Sep. 9, 1980

[54] METHOD AND APPARATUS FOR PRODUCING A MASA PRODUCT

[75] Inventor: Claudio dos Santos, Salt Lake City, Utah

[73] Assignee: Beehive Machinery, Inc., Sandy, Utah

[21] Appl. No.: 2,664

[22] Filed: Jan. 11, 1979

[51] Int. Cl.³ .............................................. B02C 18/14
[52] U.S. Cl. ........................................... 241/7; 241/8; 241/82.3; 241/260.1; 426/482; 426/518
[58] Field of Search ................ 99/605, 612, 574, 575; 426/481, 482, 518; 241/7, 8, 12, 13, 74, 89.3, 246, 247, 260.1, 276, 6, 82.3; 198/669; 425/203

[56] References Cited

U.S. PATENT DOCUMENTS

| | | | |
|---|---|---|---|
| 96,998 | 11/1869 | Tauszky | 241/8 |
| 979,186 | 12/1910 | McGeehee | 241/6 X |
| 3,498,796 | 3/1970 | Bailey | 241/8 X |
| 3,739,994 | 6/1973 | McFarland | 241/74 |

FOREIGN PATENT DOCUMENTS

317873 12/1956 Fed. Rep. of Germany ........... 425/203
132066 8/1978 Fed. Rep. of Germany ........... 198/669

Primary Examiner—Mark Rosenbaum
Attorney, Agent, or Firm—Philip A. Mallinckrodt; Robert R. Mallinckrodt

[57] ABSTRACT

A method and apparatus for processing raw, dry, corn kernals into a milled masa product for use in making corn chips, tortilla chips, and similar products, comprises the steps of heating and soaking such corn kernels, breaking the hulls of the soaked corn kernals, and forcing entirely the hull-broken, corn kernals through a plate perforated as a sieve, the perforations of the plate being very small relative to the size of the corn kernals. Preferably, the moisture content of the masa product is adjusted to about 50% by weight. The perforated plate is advantageously a closed-ended tube, within which a screw conveyor operates to transport the mass of hull-broken corn kernals through and along the tube to its midpoint from feed locations adjacent to the closed ends of the tube while forcing the mass through the perforations of the tube.

11 Claims, 3 Drawing Figures

METHOD AND APPARATUS FOR PRODUCING A MASA PRODUCT

BACKGROUND OF THE INVENTION

1. Field

The invention is in the field of methods and apparatus for producing a masa product from dried corn kernals.

2. State of the Art

The current method of producing a milled masa product from dried corn kernals for use in the making of corn chips, tortilla chips, and similar products includes, as necessary steps, cooking, soaking, and aging the dried corn kernals in a lime solution to soften the outer hulls of the kernals, washing the kernals to remove as much residual lime as possible, and then grinding the kernals by means of conventional stone or steel grinding mills as normally employed for grains, such as wheat.

The current method has disadvantages, primarily in the long cooking, soaking, and aging time required, typically between 12 and 24 hours. Even then, the conventional grinding procedures do not give consistent results.

SUMMARY OF THE INVENTION

According to the invention, raw, dry corn kernals may be processed into a superior milled masa product without the long pre-treatment time ordinarily required. Although heating and soaking in lime water may be employed to retain the customary lime aftertaste in the chip products produced from the masa product of the invention, soaking may be accomplished in plain water and, whether carried out with or without lime, such heating, and soaking consume only a fraction of the usual pre-treatment time.

Thus, in the process of the invention the dry corn kernals are pre-treated for only about four hours as opposed to the twelve to twenty-four hours in the conventional process.

A preferred pre-treatment in accordance with the invention comprises the steps of placing the dry corn kernals in a vessel of boiling water and maintaining the water boiling for about five minutes. Heat is removed from the vessel, and the water and corn kernals are allowed to cool for about two hours under ambient conditions, bringing the temperature down to about 160° F. The corn kernals are then futher cooled and washed by establishing a low volume flow of cool tap water through the vessel for about an additional two hours.

Following this pre-treatment, the hulls of the kernals are broken by passing the kernals through a set of crushing rolls spaced apart about one-eighth of an inch.

Thereafter, the mass of hull-broken kernals is entirely, hull and all, forced through a plate perforated as a sieve, the perforations being very small in relation to the size of the corn kernals. This produces a uniform and highly desirable masa product. The moisture content of the mass of material is desirably adjusted to about 50% by weight, either before or after the material is forced through the perforations.

Apparatus of the invention comprises an elongate tube perforated as a sieve and having its ends closed. Means are provided for progressively feeding the mass of hull-broken, boiled and soaked corn kernals into the tube adjacent to its respective ends. A screw conveyor within and extending along the length of the tube has its screw flights oppositely directed along respectively opposite end portions of the screw, so as to move the mass of material, as fed, toward the midpoint of the tube and to force it through the perforations of the tube, which are small relative to the size of the corn kernals.

THE DRAWINGS

The best mode presently contemplated for carrying out the invention is illustrated in the accompanying drawings, in which:

FIG. 1 is a flow diagram, showing the preferred steps of the method of the invention;

FIG. 2, a top plan view of a milling machine conforming to the apparatus of the invention; and FIG. 3, a vertical section taken along the line 3—3 of FIG. 2 and drawn to a larger scale.

DETAILED DESCRIPTION OF THE ILLUSTRATED EMBODIMENT

Figure 1:
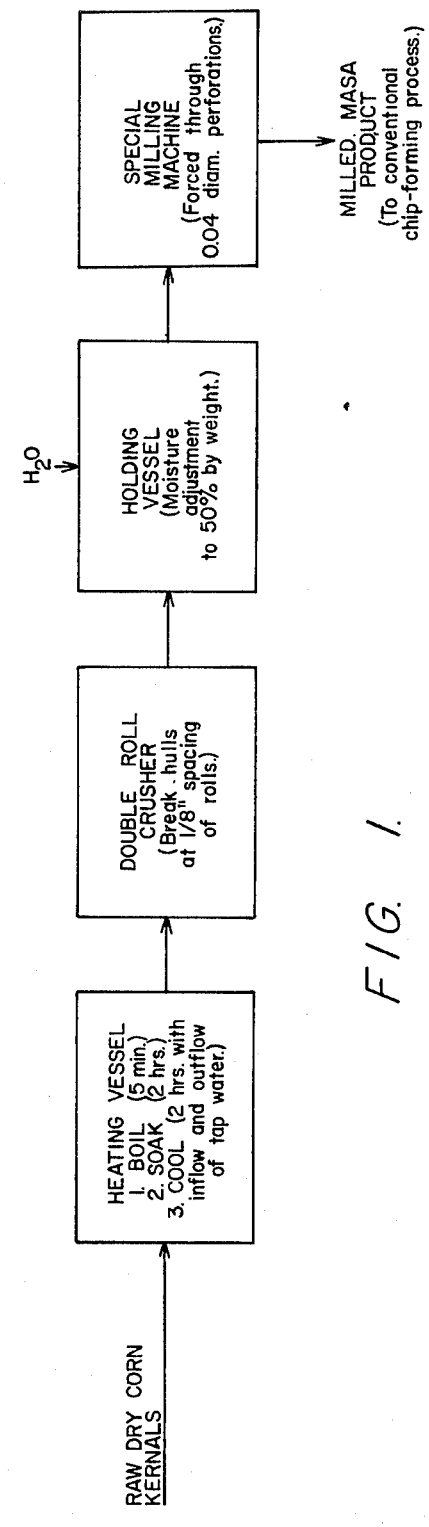

The preferred method of producing a milled masa product in accordance with the invention is illustrated by the flow diagram of FIG. 1, and begins with boiling and soaking raw, dry, corn kernals as normally used to produce a masa product by conventional processes.

The boiling and soaking steps are usually carried out in a vessel holding water to be heated to boiling temperature. The raw, dry, corn kernals are added to boiling water in the vessel, and boiling is maintained for approximately five minutes. Heat is then removed and the water and corn kernals are allowed to cool under ambient conditions for approximately two hours. In this two-hour period the vessel will cool to somewhere around 150 to 160 degrees F. After this initial cooling period, a low volume flow of water is established through the vessel using normal tap water to further cool and wash the corn kernals. The low volume is maintained for approximately two hours. In all, this heating and soaking pre-treatment occupies a time period of little more than four hours. If desired to provide chip and the like products made from the masa product of the invention with the conventional lime aftertaste, lime may be added to the water used in this pre-treatment, but it is not necessary.

After the heating and soaking, the cooled and washed corn kernals are passed through a breaking step by which the hulls of the corn kernals are broken. It is preferred that hull breaking be accomplished by a double-roll crusher whose rolls are spaced about one-eighth of an inch apart. This breaks the hulls of the kernals substantially without crushing.

It is presently preferred to adjust the moisture content of the hull-broken, corn kernal mass to approximately 50% moisture before passing the mass through the milling machine. Moisture adjustment at this point is not necessary, however, and may be accomplished after production of the masa product by the next stage of the process which involves forcing the hull-broken, corn kernal mass through the relatively small perforations of a plate perforated as a sieve. The perforations are desirably 0.040 of an inch in diameter.

Figure 2:
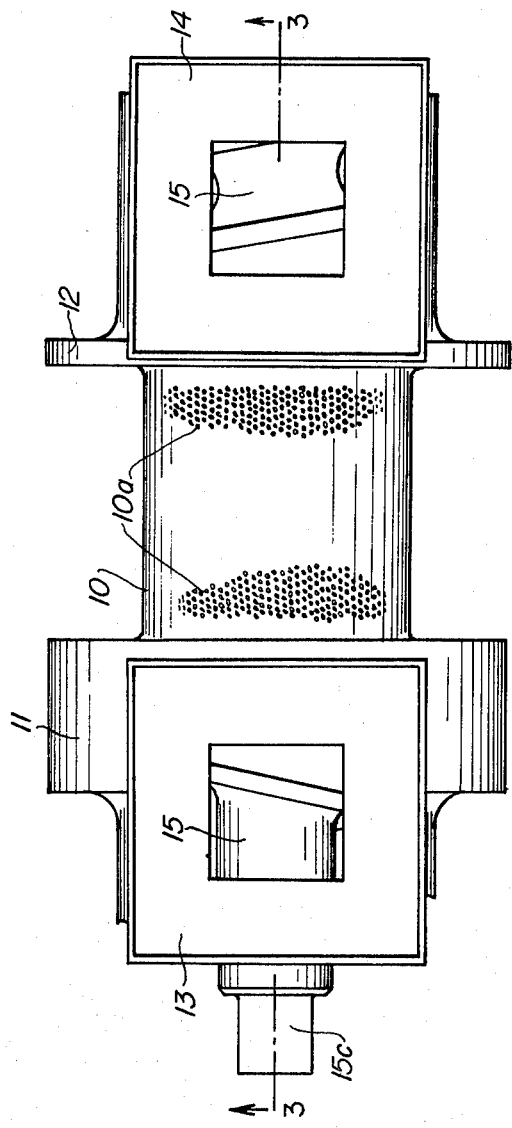
Figure 3:
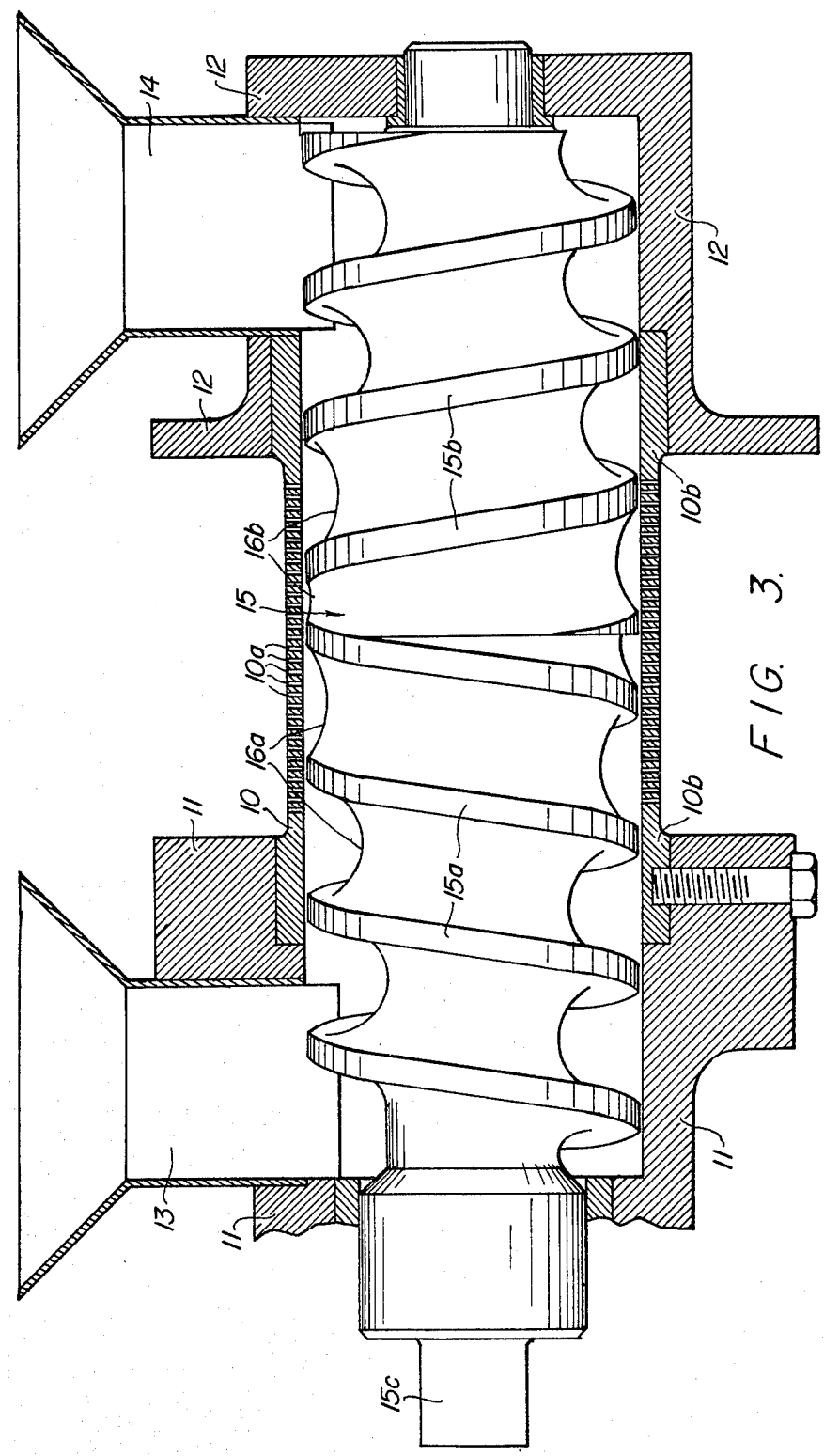

A special milling machine presently preferred for carrying out the method is shown in FIGS. 2 and 3.

As illustrated, the special milling machine comprises a substantially rigid and elongate metal tube 10, which is perforated along its length and about its periphery as a sieve, see the perforations 10a, its ends being capped and closed by respective material-feed structures in the form of end caps 11 and 12 provided with hopper members 13 and 14 that lead into the interior of the tube at respective opposite ends thereof.

Journaled in caps 11 and 12 and extending through and along the interior of perforated tube 10, in snug-fitting relationship therewith so as to substantially wipe against the interior surface thereof, is a conveyor screw 15 of compression type whose screw flights 15a and 15b are oppositely directed along respective opposite end portions of tube 10 and terminate substantially at the midpoint of the tube so as to transport along the tube the massed, hull-broken, pre-treated, corn kernal material that is progressively fed through hopper members 13 and 14. At the same time that such material is being transported through tube 10, it is being forced outwardly of the tubes through perforations 10a as the masa product of the invention.

Conveyor screw 15 is rotated by any suitable source of power through a gearbox (not shown) connected to a stub shaft member 15c of conveyor screw 15. It should be noted that, because the flights 15a and 15b of the conveyor screw are of opposite hand, rotation of the screw in one direction (clockwise in the embodiment shown) conveys material from the opposite ends of the screw toward the center of the screw. The spiral valleys 16a and 16b between flights 15a and 15b, respectively, become progressively more shallow toward the center of the conveyor screw, so that such conveyor screw progressively decreases in conveying capacity and acts with increasing force to press the conveyed material outwardly against and through the perforate wall of tube 10. The center of the screw, where the oppositely directed flights meet, serves as a block to further passage of material in either direction, thereby creating back pressure which aids in forcing the material through the perforations 10a of the tube.

The thus-milled, masa product of the invention that is expelled through perforations 10a may be scraped off by a doctor blade (not shown), operable against the outer surface of tube 10, or may be allowed to merely drop off into a suitable collection vessel for use, after moisture adjustment if necessary, in subsequent production of corn chips or the like.

It has been found that the equipment described produces a much more uniform and desirable masa product than can be achieved by use of the usual stone or steel grinding equipment currently in use.

While the special milling machine has been described for use in producing a corn masa product, it could be used with other types of cereal grains for making a somewhat similar type of paste or otherwise if desired.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of processing raw, dry, corn kernals into a milled masa product, comprising the steps of heating and soaking the dry corn kernals; breaking the hulls of the so-treated corn kernals; and transporting the hull-broken kernals within and along a closed-ended tube, perforated as a sieve, from the closed ends thereof toward the middle thereof as a mass of partially processed material, so that said material is forced out of said tube through the perforations thereof to thereby complete the processing of said material and form the desired masa product, said perforations being very small relative to the size of the corn kernals.

2. A method according to claim 1, wherein the corn kernals are heated by boiling and are then soaked and cooled in the water used for heating before the hulls thereof are broken.

3. A method according to claim 2, wherein the steps of boiling, soaking, and cooling the dry corn kernels includes introducing said kernals into a vessel of boiling water; maintaining the water at a boil for about 5 minutes; removing heat from the vessel and allowing the water in the vessel and the kernals therein to cool for about 2 hours under ambient conditions; and further cooling the kernals in the vessel while washing them by establishing a low volume flow of cool water through the vessel for about 2 hours.

4. A method according to claim 3, wherein the water in the vessel is cooled to about 160° F. prior to the further cooling and washing thereof.

5. A method according to claim 1, wherein the step of breaking the hulls of the kernels includes passing the kernels through rolls spaced about one-eighth of an inch apart.

6. A method according to claim 1, wherein the perforations of the tube are each about 0.04 inches in diameter.

7. A method according to claim 1, wherein in process is carried out so that the moisture content of the masa product is about 50% by weight.

8. A method according to claim 7, wherein the desired moisture content of the masa product is obtained by adding water to the mass of material, either before or after it is forced through the perforations of the tube.

9. A method according to claim 1, wherein the boiling and soaking is carried out in plain water.

10. Apparatus for producing a milled product from grain kernels, said apparatus comprising a tube perforated as a sieve and having closed ends; means for progressively feeding a mass of said kernels into opposite end portions of said tube; a screw conveyor operably mounted in said tube and extending substantially from end to end thereof, the screw flights of the conveyor screw being oppositely directed along respectively opposite end portions of the screw to the midpoint thereof so as to move the mass of kernels, as fed, toward the midpoint of the tube and so as to force the material of said kernels through the perforations of the tube, said perforations being small relative to the size of the kernels.

11. A method of processing raw, dry, corn kernals into a milled masa product, comprising heating and soaking said corn kernals; breaking the hulls of the boiled and soaked kernals; and forcing entirely the hull-broken kernals through a plate perforated as a sieve to produce the said milled masa product, the perforations of the plate being very small relative to the size of the corn kernals.

* * * * *